United States Patent
Petit et al.

(10) Patent No.: US 12,117,390 B2
(45) Date of Patent: Oct. 15, 2024

(54) METHOD AND APPARATUS FOR MONITORING PRODUCTION OF A MATERIAL IN A LIQUID DISPERSION IN REAL TIME

(71) Applicant: Imperial College Innovations Limited, London (GB)

(72) Inventors: Camille Petit, London (GB); Omar Matar, London (AE); Jason Stafford, Birmingham (GB)

(73) Assignee: Imperial College Innovations Limited, London (GB)

( * ) Notice: Subject to any disclaimer, the term of this patent is extended or adjusted under 35 U.S.C. 154(b) by 314 days.

(21) Appl. No.: 17/630,978

(22) PCT Filed: Jul. 27, 2020

(86) PCT No.: PCT/GB2020/051800
§ 371 (c)(1),
(2) Date: Jan. 28, 2022

(87) PCT Pub. No.: WO2021/019228
PCT Pub. Date: Feb. 4, 2021

(65) Prior Publication Data
US 2022/0260483 A1     Aug. 18, 2022

(30) Foreign Application Priority Data
Jul. 29, 2019   (GB) ..................... 1910778

(51) Int. Cl.
*G01N 21/25*   (2006.01)
*B01J 19/00*   (2006.01)
(Continued)

(52) U.S. Cl.
CPC ........ *G01N 21/255* (2013.01); *B01J 19/0006* (2013.01); *B01J 19/1843* (2013.01);
(Continued)

(58) Field of Classification Search
None
See application file for complete search history.

(56) References Cited

U.S. PATENT DOCUMENTS

| 4,278,887 A | * | 7/1981 | Lipshutz | ............ | G01N 21/0303 |
| | | | | | 356/246 |
| 2019/0271636 A1 | * | 9/2019 | Deguchi | ............ | G01N 21/0303 |
| 2020/0255294 A1 | * | 8/2020 | Stafford | ............... | B01J 19/1806 |

FOREIGN PATENT DOCUMENTS

| EP | 2846161 A1 | 3/2015 |
| GB | 2280954 A | 2/1995 |

(Continued)

OTHER PUBLICATIONS

United Kingdom Combined Search and Examination Report for corresponding Application No. GB1910778.8, dated Jan. 23, 2020, 7 pages.
International Written Opinion for corresponding Application No. PCT/GB2020/051800, dated Oct. 30, 2020, 10 pages.
International Search Report for corresponding Application No. PCT/GB2020/051800, dated Oct. 30, 2020, 34 pages.
(Continued)

*Primary Examiner* — Brandi N Hopkins
*Assistant Examiner* — Nigel H Plumb
(74) *Attorney, Agent, or Firm* — Taft Stettinius & Hollister LLP

(57) ABSTRACT

A method for monitoring the production of a material such as graphene in a liquid dispersion in real time, comprises supplying the liquid dispersion to a fluid gap defined between a first layer and an opposed second layer, wherein the first layer is light-transmissive and wherein the second layer has a diffusely reflective surface facing the first layer. The diffusely reflective surface is illuminated with light from a light source and light reflected from the diffusely reflective surface is detected at an associated photodetector.

(Continued)

A light path from the light source to the photodetector comprises the light passing through the transmissive layer towards the diffusely reflective surface through the fluid gap, reflecting off the diffusely reflective surface and passing back through the fluid gap towards and onwards through the transmissive layer.

27 Claims, 10 Drawing Sheets

(51) Int. Cl.
   B01J 19/18     (2006.01)
   C01B 32/19     (2017.01)
   C01B 32/225    (2017.01)
   G01N 21/85     (2006.01)
   G01N 21/84     (2006.01)
(52) U.S. Cl.
   CPC ............ *C01B 32/19* (2017.08); *C01B 32/225* (2017.08); *G01N 21/85* (2013.01); *B01J 2219/00186* (2013.01); *C01B 2204/04* (2013.01); *C01P 2004/24* (2013.01); *C01P 2006/60* (2013.01); *G01N 2021/8411* (2013.01)

(56) References Cited

FOREIGN PATENT DOCUMENTS

| GB | 2530827 A | 4/2016 |
| WO | 2004044558 A2 | 5/2004 |
| WO | 2005090946 A1 | 9/2005 |
| WO | 2012127650 A1 | 9/2012 |
| WO | 2018021311 A1 | 2/2018 |
| WO | 2019025784 A1 | 2/2019 |

OTHER PUBLICATIONS

Claudia Backes et al.: "Spectroscopic metrics allow in situ measurement of mean size and thickness of liquid-exfoliated few-layer graphene nanosheets," NANOSCALE, vol. 8, No. 7, Jan. 26, 2016, pp. 4311-4323, XP055741960; & Claudia Backes et al.: "Supplementary Information Spectroscopic metrics allow in-situ measurement pf mean size and thickness of liquid-exfoliated few-layer graphene nanosheets Contents," Jan. 26, 2016, XP055741962.

Jason Stafford et al: "Universal Scaling and Real-Time Monitoring of the Production of Liquid Exfoliated Graphene," Jan. 20, 2020, XP055741933, DOI: 10.26434/chemrxiv.11628267.v1; & Jason Stafford et al: "Supplementary Information Universal scaling and real-time monitoring of the production of liquid exfoliated graphen Contents," Jan. 20, 2020, XP055742149.

* cited by examiner

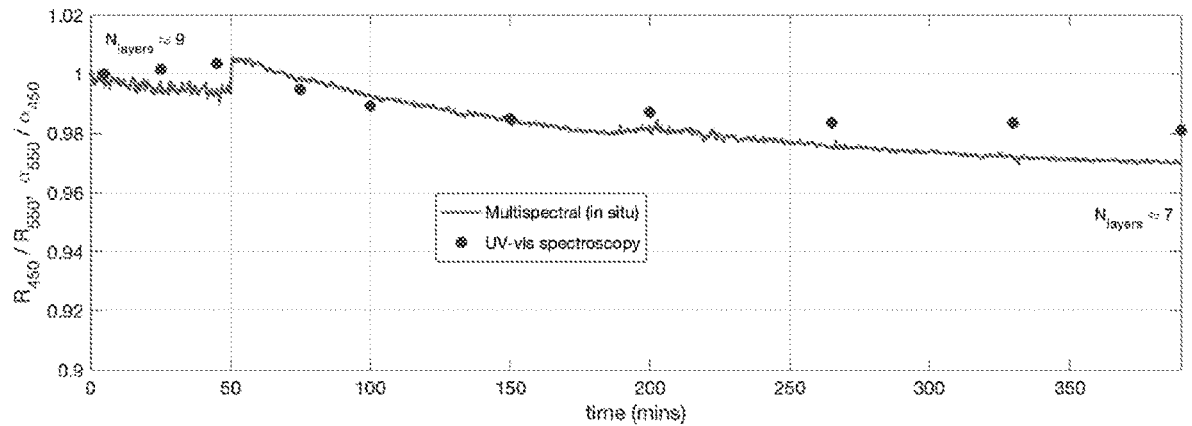
Figure 9
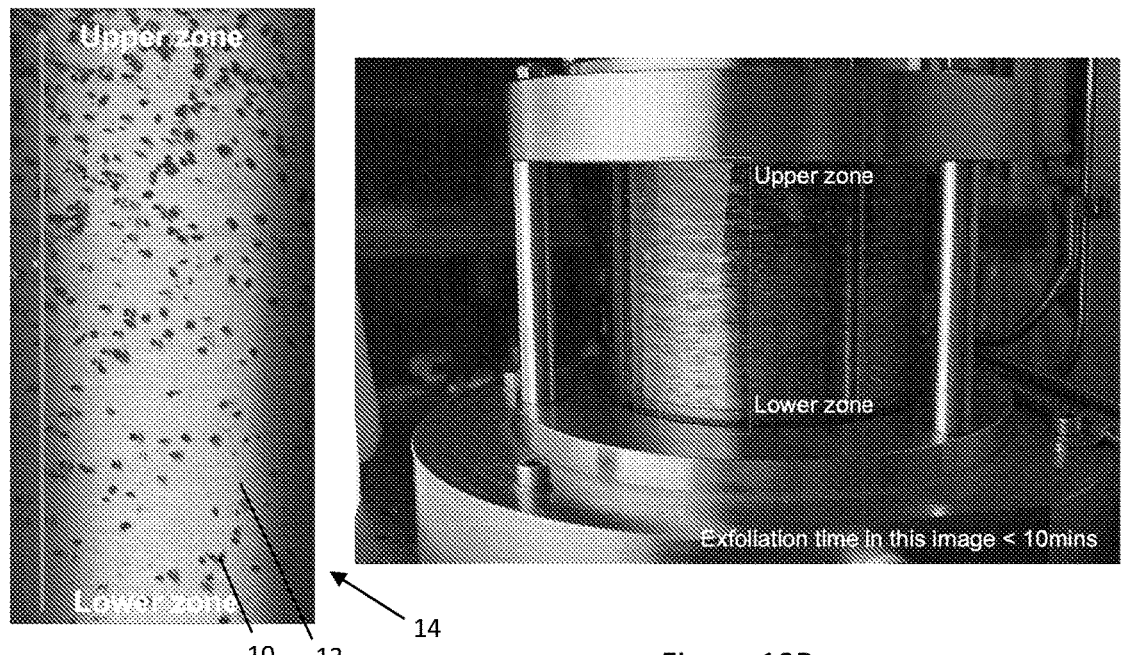
Figure 10A
Figure 10B

METHOD AND APPARATUS FOR MONITORING PRODUCTION OF A MATERIAL IN A LIQUID DISPERSION IN REAL TIME

CROSS REFERENCE TO RELATED APPLICATIONS

This is a U.S. National Stage Application of, and claims the benefit to, PCT/GB2020/051800, filed Jul. 27, 2020, which claims priority to United Kingdom patent application s/n GB 1910778.8, filed Jul. 29, 2019, the contents of each is incorporated herein by reference in its entirety.

This invention relates to methods and apparatus for monitoring the production of a material in a liquid dispersion in real time. In particular, but not exclusively, the methods and apparatus are for non-invasively detecting, the properties of two-dimensional (2D) nanomaterials (such as graphene) produced during a fluid exfoliation production method.

BACKGROUND

Atomically thin, 2D monolayer materials have demonstrated remarkable properties in numerous research studies over the past decade. The most widely studied 2D material is graphene, with intrinsic mobilities of over 200,000 $cm^2$ $v^{-1}$ $s^{-1}$, Young's modulus of about 1 TPa, optical transmittance of about 97.7%, and thermal conductivity of about 5000 W $m^{-1}$ $K^{-1}$, respectively. These unique material characteristics suggest that graphene has the potential to provide revolutionary advances in applications such as opto-electronics, semiconductors, biomedical sensors, tissue engineering, drug delivery, energy conversion and storage. Other monolayer materials such as monolayers of hexagonal boron nitride (h-BN), molybdenum disulfide ($MoS_2$), molybdenum trioxide ($MoO_3$), gallium telluride (GaTe) or bismuth selenide ($Bi_2Se_3$) have also shown promise in similar areas. These applications are within three broad sectors that have the biggest impact on society: information communication technology (ICT), biomedicine and energy. It is, therefore, imperative that these exciting materials can be exploited on a large scale to address the global challenges that society faces.

Fundamental research in the field of 2D materials has grown rapidly, and new materials with unique properties and novel applications are being discovered continuously. Despite these efforts, the widespread introduction of 2D materials into real technologies that benefit society are limited. The main challenge attributed to this, as outlined by various recent reviews (E. P. Randviir et al., Materials Today, 17.9 (2014), 426-432 and A. C. Ferrari et al., Nanoscale, 7 (2015), 4598-4810, the contents of which are herein incorporated by reference in their entirety), is the development of suitable processes for scale-up and mass production. Growth and exfoliation are the two main avenues to produce 2D materials. Liquid exfoliation methods have been described as exhibiting either high production rates or low defects and show promise for scale-up (K. R. Paton et al., Nature Materials, 13 (2014), 624-630, the contents of which are herein incorporated by reference in their entirety). Sonication, chemical and electrochemical are the most common methods for liquid exfoliation that have been used at a laboratory scale. A study published in 2014 on scalable production of graphene using a shear-mixing batch exfoliation approach in liquids demonstrated yields of less than 3% (K. R. Paton et al., Nature Materials, 13 (2014), 624-630). In a large-scale trial, just 21 g of high quality graphene with Raman D/G ratio of 0.18 was produced from a 300 L mixture of graphite (21 kg) and N-Methyl-2-pyrrolidone (NMP) solvent. The production rate for this trial was the highest reported in the literature to date at 5.3 g $h^{-1}$. Although process scaling was achieved, yield and production rate remain extremely low for economical manufacturing or widespread use.

In addition to graphene, a wide range of layered materials, including oxides, chalcogenides, and clays are of interest because of their optical, electrical, and mechanical properties. While many methods can be used to cleave layered sheets from the bulk material, they are difficult to scale up. Liquid exfoliation routes may hold the best promise for making materials in large quantities.

There is a fundamental limitation with existing shear-exfoliation approaches due to the batch processing characteristic. The raw material is a mixture of the layered material to be exfoliated (e.g., graphite particles), and a liquid for stabilising and preventing re-aggregation of the nanosheets. Existing exfoliation methods are designed for laboratory scale. However, it is inefficient when processing at a large scale. In typical batch ultrasonic exfoliation, the amount of energy per unit volume of, for example, a liquid-graphite mixture is of order $10^{10}$ J $m^{-3}$ to maintain yields of 0.1%. Each individual step in the process is segregated and solutions must be passed from one stage to the next in a discontinuous manner. This increases processing time and the risk of exposure to potentially harmful solvents (such as NMP). The state-of-the-art also suffers from scale-up effects. The spatial distribution of shear stress within existing batch exfoliation designs is non-uniform and the velocity fields are highly chaotic, leading to poor repeatability in product output. Hence, designing scaled-up systems is challenging, as the fluid mechanics and local shear rate distributions change with dimensions of the container.

Accordingly, there is a need to provide an efficient, cost-effective and scalable process for the production of 2D monolayer materials at any scale. One process and apparatus has been disclosed in WO2019025784, the contents of which are herein incorporated by reference in their entirety. The apparatus disclosed therein is for fluidic exfoliation of a layered material and comprises: a housing of circular cross-section defined by a housing wall; a hollow rotor of circular cross-section having a first end and a second end and a wall positioned therebetween arranged concentrically within the housing. The wall of the hollow rotor defines an inner chamber and the space between the wall of the hollow rotor and the housing wall defines an outer chamber. A fluid flow path is provided between the inner chamber and the outer chamber. A fluid inlet is in fluid communication with the inner chamber or the outer chamber, and a fluid outlet is in fluid communication with the other of the inner chamber or the outer chamber. The outer chamber has a width such that on passage of a fluid comprising the layered material from the inlet to the outlet through the outer chamber, a shear rate sufficient to exfoliate the layered material may be applied to the fluid comprising the layered material in the outer chamber by rotation of the hollow rotor.

This challenge of developing suitable processes for scale-up and mass production involves improving, not only the yield and efficiency of production methods, but the entire end-to-end production cycle. This includes the exfoliation method (i.e. the approach used to separate nanosheets from a layered precursor) and methods required for the control of material quality, reproducibility, batch traceability, and integration within a smart manufacturing environment (i.e. Industry 4.0). The overwhelming focus from the research community, to date, has been around improving the exfoliation method. The measurement of production output and quality is currently achieved through lab-scale ex situ approaches. An example of this step is illustrated in FIG. 1. A batch of raw layered material 10, such as graphite, is introduced together with a liquid solution 12 as a liquid dispersion 14 into a container 16. The liquid dispersion 14 is subjected to sonication, shear-mixing or other suitable means of agitation in order to exfoliate the raw layered material 10 into few-layer nanosheets 18 or monolayer nanosheets 20 (e.g. graphene). Samples 22 are taken manually from the container 16 during the exfoliation process. These samples are put through a centrifuge 24 to separate the nanomaterial 18, 20 from the layered precursor 10. The resulting dispersion is then tested using a suite of lab-based spectroscopy and microscopy approaches to determine nanomaterial characteristics (i.e. concentration, nanosheet dimensions, oxidation, defects). This ex situ approach has a number of disadvantages: 1. Sampling is invasive; 2. The time required to process samples is far greater than the time required to produce the material. Generally, for 1 day of producing these nanomaterials, 5 days are spent preparing and characterising the output; 3. This slow turnaround time is a major issue for industry who are producing 1000's of kg of material. Discovering an issue with a batch days after it was produced leaves no possibility for remedial action. This has environmental consequences if a batch is irrecoverable and requires disposal; and 4. The slow turnaround time also adversely impacts the design and optimisation of exfoliation processes for maximum yield and production rate.

Accordingly, there remains a need to provide an efficient, cost-effective and scalable process for monitoring 2D material production in real time and non-invasively. Moreover, the need extends also to other material production processes and other industrial sectors that perform chemical reactions, such as chemical processing industries (e.g. sensing formulations), drug discovery and pharmaceutical production.

BRIEF SUMMARY OF THE DISCLOSURE

In accordance with a first aspect of the present invention, there is provided a method of monitoring the production of a material in a liquid dispersion in real time, comprising:

supplying the liquid dispersion to a fluid gap defined between a first layer and an opposed second layer, wherein the first layer is light-transmissive and wherein the second layer has a diffusely reflective surface facing the first layer;

illuminating the diffusely reflective surface with light from a light source and detecting light reflected from the diffusely reflective surface at an associated photodetector, wherein a light path from the light source to the photodetector comprises the light passing through the transmissive layer towards the diffusely reflective surface through the fluid gap, reflecting off the diffusely reflective surface and passing back through the fluid gap towards and onwards through the transmissive layer; and determining, from the detected reflected light, the concentration of the material in the liquid dispersion.

The determination of the concentration of the material in the dispersion can therefore be made in situ, using relatively basic equipment that can easily be fitted to production equipment, even by retro-fitting, with little or no modification required. This diffuse reflectance spectroscopy approach provides for opportunities to react in real time to events occurring during the production process, such as identifying when optimal production conditions are achieved, identifying when a predetermined amount of the material has been produced (so production can stop or a fresh supply of raw material can be input), and identifying problems in the production process so that remedial action can be taken in a timely manner. The technique is also non-invasive, so will not adversely affect the production process.

The supply of the liquid dispersion to the fluid gap may be continuous. This has the advantage of the portion of the liquid dispersion being monitored through the diffuse reflectance spectroscopy always immediately reflecting the conditions in the associated production batch. In certain embodiments, the supply to the fluid gap may instead be intermittent, for example the liquid dispersion being tapped off, e.g. under valve control, to the fluid gap. In either instance, there is no need for discrete samples to be taken away for ex situ analysis.

The concentration of the material in the liquid dispersion may determined by detecting the fraction of light that arrives at the photodetector from the light source. The amount of light that arrives at the photodetector compared to the amount that is emitted by the light source is indicative of the amount of light that is absorbed, reflected and scattered in the light path. Because the transmissive layer and the diffuse surface are effectively constant, any changes in the quantity of light reaching the photodetector indicate a change in the liquid dispersion in the fluid gap. Those changes can be detected as a ratio of emitted light to received light (transmittance) or the inverse (absorption).

The method may further comprise moving one or both of the first and second layers. Because the first layer is transmissive, whether or not it is moving is largely immaterial (provided it has relatively homologous properties). Likewise, a homologous diffuse surface on the second layer means that whether or not that is moving also or instead is largely immaterial. This can be advantageous when incorporating the monitoring equipment (the light source and photodetector) into production apparatus, parts of which may be required to move relative to other parts for best operation, for example.

The method may further comprise inducing flow in the liquid dispersion within the fluid gap. Accordingly, any or all of the first layer, second layer and liquid dispersion in the fluid gap may be moving, in absolute or relative terms. This can be beneficial when the fluid gap forms an integral part of the production process.

The method may further comprise further comprising inducing a dispersion gradient in the liquid dispersion within the fluid gap. By producing a dispersion gradient, in the form of a concentration gradient in which one zone has a higher concentration of material in suspension in the liquid than another zone, the light path can be located in an optimal location for best detecting the changes in concentration of the material in the liquid dispersion. For example, in one embodiment, the light path from the light source to the photodetector is directed through a zone of least concentration. This has been shown to provide the best signal to noise ratio for the photodetector, accordingly leading to more accurate detection.

The material may comprise a 2D nanomaterial and the method of production may comprise fluidic exfoliation. The invention has particular benefits when applied to the production of 2D material through liquid exfoliation. The 2D nanomaterial may comprise material exfoliated from a layered material such as graphite, BN, GaTe, $Bi_2Se_3$, $Bi_2Te_3$, $Sb_2Te_3$, TiNCl, black phosphorus, layered silicate, layered double hydroxide (such as $Mg_6Al_2(OH)_{16}$) or a transition metal chalcogenide having the formula $MX_n$, wherein M is a transition metal, X is a chalcogen and n is 1 to 3, or a combination thereof. M may be selected from the group comprising Ti, Zr, Hf, V, Nb, Ta, Cr, Mn, Mo, W, Tc, Re, Ni, Pd, Pt, Fe and Ru; and X may be selected from the group comprising O, S, Se, and Te. Exemplary metal chalcogenides include molybdenum disulfide ($MoS_2$) and molybdenum trioxide ($MoO_3$). Further layered materials that may be used in the present invention are disclosed in V. Nicolosi et al., Science, 340 (2013), 1420, the contents of which are herein incorporated by reference in their entirety. Preferably, the material is graphene produced from a graphite precursor.

Where the material is a 2D nanomaterial produced through liquid exfoliation, illuminating and detecting the light may comprise a multispectral analysis, in which the method further comprises determining the average number of layers of the nanomaterial in the dispersion by determining a ratio of light detected in a first frequency range to light detected in a second frequency range. Where the extinction coefficient spectra of the 2D material have differing maxima for differing characteristic numbers of atomic layers in the material within a first frequency range and yet also have a common overlapping portion at a second frequency range, that can be used to determine the average number of layers in the nanomaterial within the liquid dispersion on the basis of a comparison of the light detection at a first frequency within the first frequency range (or an associated band centred on that first frequency) and at a second frequency within the second frequency range (or associated band centred on that second frequency). For example, for graphene, the first frequency range may comprise about 260 nm-450 nm, which coincides with the overlapping portion of the spectra, and the second frequency range may comprise about 550 nm-900 nm, where the different numbers of layers result in different maxima.

The liquid dispersion may comprise an organic solvent. Exemplary organic solvents include: N-methyl pyrrolidone (NMP), cyclohexylpyrrolidone, di-methyl formamide, cyclopentanone (CPO), cyclohexanone, N-formyl piperidine (NFP), vinyl pyrrolidone (NVP), 1,3-dimethyl-2-imidazolidinone (DMEU), bromobenzene, benzonitrile, N-methyl-pyrrolidone (NMP), benzyl benzoate, N,N'-dimethylpropylene urea, (DMPU), gamma-butrylactone (GBL), Dimethylformamide (DMF), N-ethyl-pyrrolidone (NEP), dimethylacetamide (DMA), cyclohexylpyrrolidone (CHP), dimethyl sulfoxide (DMSO), dibenzyl ether, chloroform, isopropylalcohol (IPA), cholobenzene, 1-octyl-2-pyrrolidone (N8P), 1-3 dioxolane, ethyl acetate, quinoline, benzaldehyde, ethanolamine, diethyl phthalate, N-dodecyl-2-pyrrolidone (N12P), pyridine, dimethyl phthalate, formamide, vinyl acetate or acetone or a combination thereof. Preferably, the organic solvent is NMP.

The liquid dispersion may further comprise a polymer, for example selected from polyvinyl alcohol (PVA), polybutadiene (PBD), poly(styrene-co-butadiene) (PBS), polystyrene (PS), polyvinylchloride (PVC), polyvinylacetate (PVAc), polycarbonate (PC), polymethylmethacrylate (PMMA), polyvinylidene chloride (PVDC) and cellulose acetate (CA). The liquid dispersion may further comprise a surfactant, for example selected from the group comprising sodium cholate (NaC), sodium dodecylsulphate (SDS), sodium dodecylbenzenesulphonate (SDBS), lithium dodecyl sulphate (LDS), sodium cholate (SC), sodium deoxycholate (DOC), sodium taurodeoxycholate (TDOC), polyoxyethylene (40) nonylphenyl ether, branched (IGEPAL CO-890® (IGP)), polyethylene glycol p-(1,1,3,3-tetramethylbutyl)-phenyl ether (Triton-X 100® (TX-100)), cetyltrimethyl ammoniumbromide (CTAB), tetradecyltrimethylammonium bromide (TTAB), Tween™ 20 and Tween™ 80. Further surfactants that may be used in the present invention are disclosed in R. J. Smith et al., New Journal of Physics, 12 (2010), 125008, the contents of which are herein incorporated by reference in their entirety.

In accordance with a second aspect of the invention, there is provided an apparatus for monitoring the production of a material in a liquid dispersion in real time, comprising:

a fluid gap defined between a first layer and an opposed second layer, wherein the first layer is light-transmissive and wherein the second layer has a diffusely reflective surface facing the first layer;

a light source; and a photodetector;

wherein the fluid gap is in fluid communication with the liquid dispersion;

wherein a light path from the light source to the photodetector comprises the light passing through the transmissive layer towards the diffusely reflective surface through the fluid gap, reflecting off the diffusely reflective surface and passing back through the fluid gap towards and onwards through the transmissive layer; and wherein the photodetector is configured to determine, from the light reflected off the diffusely reflective surface, the concentration of the material in the liquid dispersion.

The fluid gap may be an integral part of a vessel for producing the material. As such, beneficially, the monitoring can easily be incorporated into the vessel without affecting the production process.

The vessel for producing the material may be a vessel for fluidic exfoliation of a layered material and may comprise:

a housing of circular cross-section defined by a housing wall;

a hollow rotor of circular cross-section having a first end and a second end and a wall positioned therebetween arranged concentrically within the housing, wherein the wall of the hollow rotor defines an inner chamber and the space between the wall of the hollow rotor and the housing wall defines an outer chamber, and wherein a fluid flow path is provided between the inner chamber and the outer chamber;

a fluid inlet in fluid communication with the inner chamber or the outer chamber; and a fluid outlet in fluid communication with the other of the inner chamber or the outer chamber;

wherein the outer chamber has a width such that on passage of a fluid comprising the layered material from the inlet to the outlet through the outer chamber, a shear rate sufficient to exfoliate the layered material may be applied to the fluid comprising the layered material in the outer chamber by rotation of the hollow rotor;

wherein the fluid comprising the layered material is the liquid dispersion and the material produced by the fluidic exfoliation comprises a 2D nanomaterial; and wherein the fluid gap comprises at least a portion of the outer chamber.

This is an apparatus in accordance with that disclosed in WO 2019/025784; the diffuse reflectance spectroscopy method according to the first aspect of the invention can advantageously be incorporated into such a vessel. Accordingly, the first layer may comprise at least a portion of the housing wall and the second layer may comprise at least a portion of the hollow rotor wall. The first layer may comprise borosilicate glass, which is a convenient material for providing the required transmissivity yet also having the necessary structural and inert properties. Other suitable transmissive materials include calcium fluoride, fused silica, fused quartz and sapphire. The second layer may comprise stainless steel, which is a convenient material for providing the diffuse surface—for example by being left in an as-machined state.

The light source may comprise a broad spectrum LED. This is an inexpensive, simple and readily available item.

The photodetector may comprise a CMOS silicon photodiode array. This is also a relatively inexpensive, simple and readily available item.

The photodetector may further comprise one or more Gaussian filters for detecting light in one or more associated frequency bands, which may be 40 nm bands, for example. The use of Gaussian filters provides a simple and cost-efficient way to implement multi-spectral detection and associated analysis.

In certain embodiments, the photodetector is configured to detect in at least first and second frequency ranges and to determine a ratio of light detected in those first and second frequency ranges. This provides the capability to determine the average number of layers of a 2D nanomaterial in a liquid dispersion in real time during liquid exfoliation thereof, where the material's absorption spectra and the first and second frequency ranges are suited. For example, for determining the average number of layers of graphene, the first frequency range may comprise about 260 nm-450 nm and the second frequency range may comprise about 550 nm-900 nm.

According to another aspect of the invention, there is provided the use of the apparatus as described herein in determining the concentration of a material in a liquid dispersion in real time during production thereof.

According to another aspect of the invention, there is provided the use of the apparatus as described herein in determining the average number of layers of a 2D nanomaterial in a liquid dispersion in real time during liquid exfoliation thereof.

As would be appreciated, the features discussed in relation to the apparatus of the invention apply mutatis mutandis to the discussion of the method, which makes use of the apparatus of the invention. Moreover, the features discussed in relation to the method of the invention apply mutatis mutandis to all other aspects of the invention.

BRIEF DESCRIPTION OF THE DRAWINGS

Embodiments of the invention are further described hereinafter with reference to the accompanying drawings, in which:

FIG. 9 is a graph showing multispectral sensing to measure changes in the average layer number in graphene dispersions;

FIGS. 10A and 10B are photographs respectively showing a detail and a wider view of an apparatus according to embodiments of the invention under operation producing graphene, illustrating the development of a graphite concentration gradient during liquid phase exfoliation;

DETAILED DESCRIPTION

Figure 2:
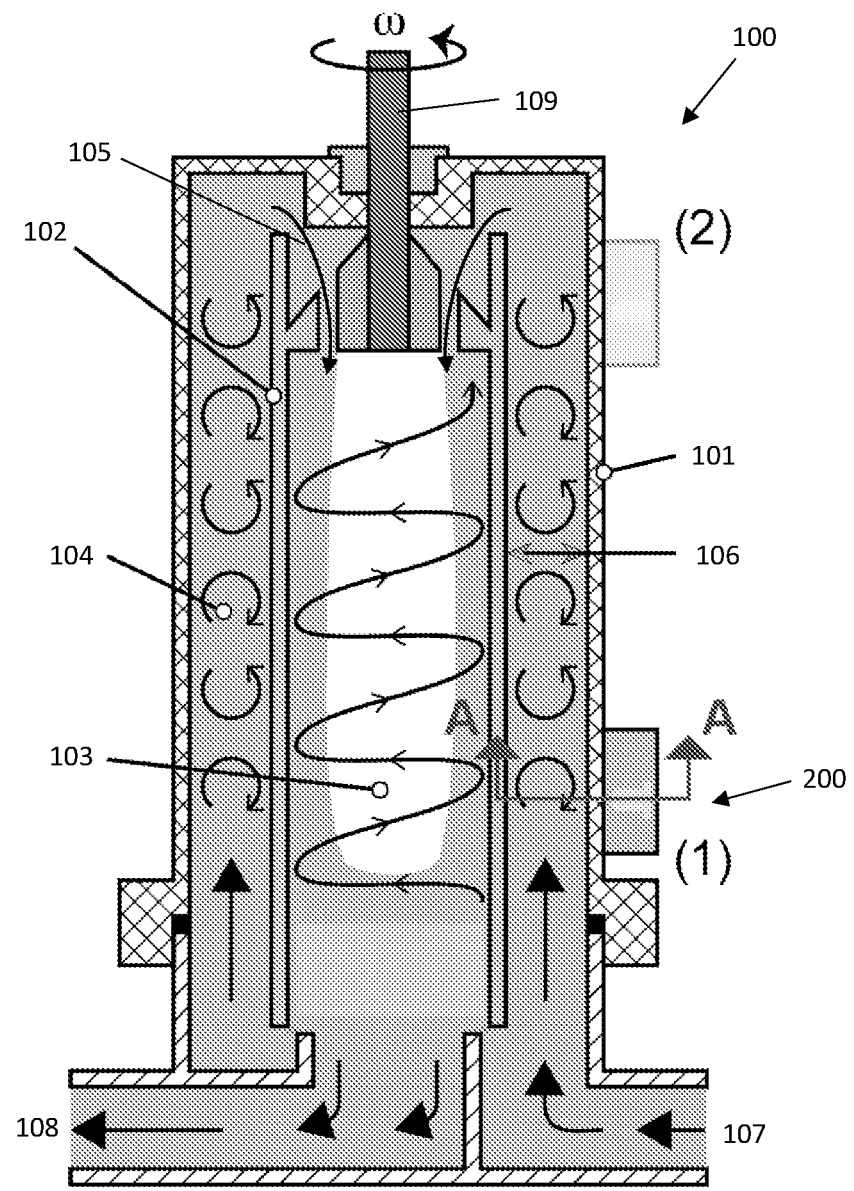
FIG. 2 is a cross-sectional side view through an apparatus according to embodiments of the invention.

With reference to FIG. 2, there is provided an apparatus 100 for the continuous exfoliation of a layered material. The apparatus comprises a housing 101 of circular cross-section and a rotor of circular cross-section 102 arranged concentrically within the housing. The rotor defines an inner chamber 103 and the space between the rotor and the housing defines an outer chamber 104. A fluid flow path 105 is provided between the outer chamber and the inner chamber. The apparatus also comprises a fluid inlet 107 in fluid communication with the outer chamber and a fluid outlet 108 in fluid communication with the inner chamber. The outer chamber has a width 106 of about 3 mm. The apparatus further comprises a motor and shaft 109 configured to rotate the rotor 102.

The following steps outline an exemplary process for exfoliating a layered material using an apparatus as shown in FIG. 2:

1. A liquid dispersion 14 comprising a precursor layered material 10 (e.g. graphite, Sigma-Aldrich® 332461) and a suitable solvent 12 (e.g. N-Methyl-2-Pyrrolidone ('NMP'), VWR 2621 1.425) is supplied, for example using an external pump (not shown), at a relatively low rate (e.g. 10 mL $min^{-1}$) from a reservoir (not shown) to the outer chamber 104 via the inlet 107 to bleed the system, thereby ensuring that the entire fluid loop through the outlet 108 back to the reservoir is without trapped air during the exfoliation operation.

2. Once this initial bleed is completed, the motor connected to the rotor 109 is switched on and rotated at speed that results in exfoliation (e.g. >1000 r.p.m.—the speed for exfoliation will depend on a number of factors including the precursor material and solvent combination and the size of the fluid gap).

3. With the rotor 102 spinning at the set speed, the liquid dispersion is circulated from the reservoir to the device at a higher flow rate of, for example, 50 mL $min^{-1}$ using the pump. The rotation of the hollow rotor 102 relative to the housing 101 simultaneously creates two fluidic zones. The first fluidic zone is in the annular gap 106 defined between the outer surface of the rotor 102 and the inner wall of the outer casing 101. The motion of the rotating rotor 102, relative to the housing 101, generates high mixing and shearing forces in the fluid comprising the layered material, i.e. the liquid dispersion 14, within the fluid gap 106 (stage 1). An external pump (not shown) may be used to drive this fluid 14 through the fluid flow path towards the top of the outer chamber at a user-specified flow rate. The fluid leaves the outer chamber 104 and enters the inner chamber 103 between the wall of the rotor 102 and the housing wall 101. The second fluidic zone is in the inner chamber 103 within the hollow rotor. An axially centred vortex provides a secondary (stage 2) mixing and shearing of the liquid dispersion 14 at a lower rate than in the first zone. Of course, as would be appreciated by a skilled person, the flow may be reversed and the fluid may pass through the inner chamber 103 before the outer chamber 104 during operation of the device.

4. The mixing and shearing forces result in exfoliation of the precursor layered material 10 to produce few-layer nanosheets 18 or monolayer nanosheets 20 of material (graphene).

The apparatus 100 is thus similar to that disclosed in WO 2019/025784, and functions in a similar manner, but has modifications to the outer casing 101 and inner rotor 102 as explained below, as well as the addition of a diffuse reflectance spectroscopy device 200 positioned on the outside of the outer casing 101 and comprising a light source 210, associated photodetector 220 and associated electronics.

Figure 3:
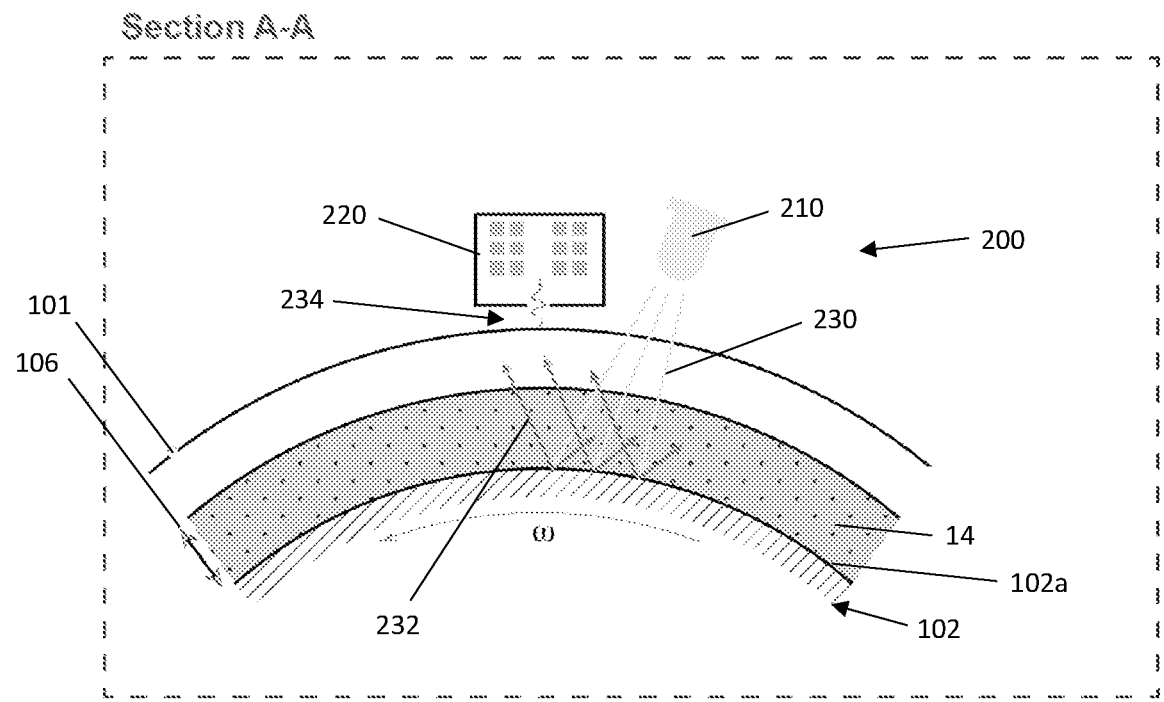
FIG. 3 is a cross-sectional plan view through Section A-A of FIG. 2.
Figure 4:
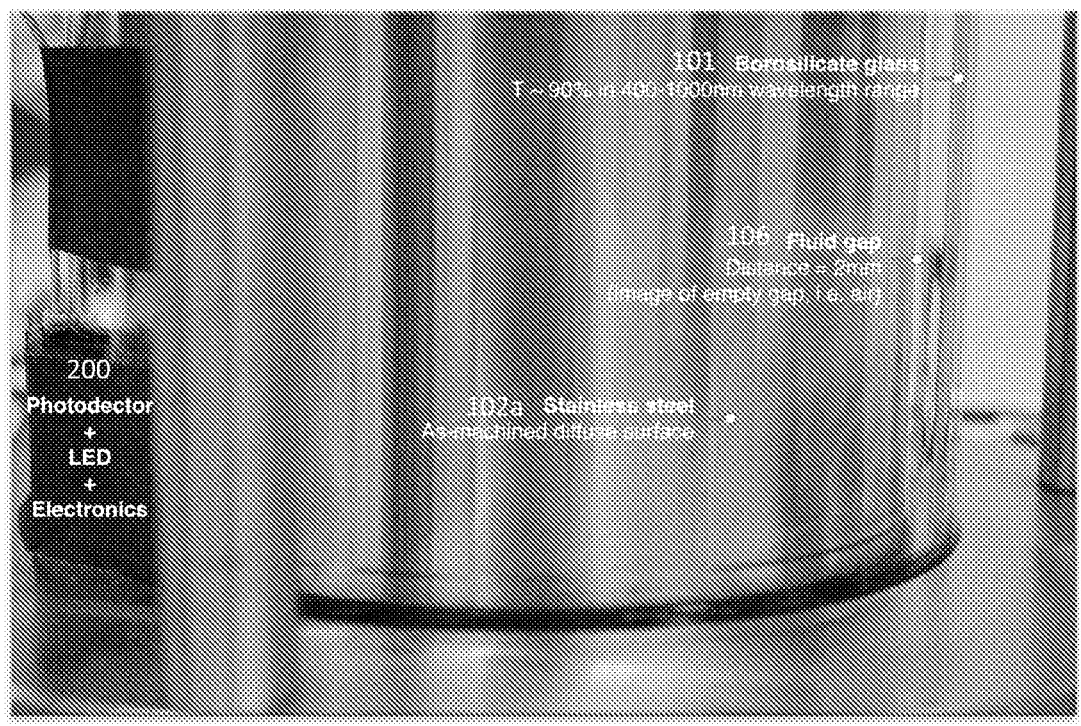
FIG. 4 is a photograph of an exterior of an apparatus according to embodiments of the invention, showing a diffuse stainless steel surface, borosilicate glass casing and intervening fluid gap, taken without a liquid dispersion present for clarity.

With further reference to FIG. 3, which is a cross section through A-A of FIG. 2, the outer casing 101 is formed of material transmissive to light emitted form the light source 210. In one embodiment, as shown in FIG. 4, the outer casing is formed of borosilicate glass, which has a transmissivity T of approximately 90% in the 400 nm-1000 nm wavelength range. More broadly, the light-transmissive layer is preferably transmissive of light in the UV-vis-nIR range, or at least matched to the optical properties of the associated light source and photodetector so that the light-transmissive layer can be selected to affect the light path as little as possible. In the embodiment of FIG. 2, the diffuse reflectance spectroscopy device 200 is positioned at location (1), but in an alternative embodiment it could be located elsewhere on the outer casing, for example higher up at position (2). The reason for the location is explained in more detail below. The rotor 102 has an outer surface 102a that is diffusely reflective. In one embodiment, shown in FIG. 4, the rotor 102 may be formed of stainless steel and the outer surface may comprise an as-machined surface. This has the advantage of being cost-effective way to incorporate a suitably diffuse surface into the apparatus. However, it will be appreciated that the diffuse surface may be obtained in other ways, such as by treating the surface (e.g. by etching or brushing of a metallic surface) or by applying a dedicated diffusive layer on to a base substrate (for example by deposition), which has the potential advantage of allowing the substrate to be formed of a material that is not itself suited to forming a diffusely reflective surface. Borosilicate glass and stainless steel are both chemically inert materials that will typically not react with the components of the liquid dispersion 14, so will not affect the material production process occurring within the apparatus 100. The fluid gap 106 is disposed between the light-transmissive outer casing 101 and the rotor 102 and is filled with the liquid dispersion 14. Other suitable light-transmissive materials for the first layer 101 include calcium fluoride, fused silica, fused quartz and sapphire. Other suitable materials for the diffuse surface 102a include metals such as copper, aluminium, brass and mild steel, and polymers such as polytetrafluoroethylene (PTFE) and nylon. In certain other applications where reactions may be involved, this diffuse surface 102a could be bifunctional: i.e. acting as both a diffusive surface for the measurement, and as a catalyst material for the reaction.

It will be appreciated that not all of the outer casing 101 need be formed of the same material and it may be sufficient to have only a portion thereof, through which the light path passes, formed of light-transmissive material.

Light is produced by the light source, which is in the form of an LED 210 in the illustrated embodiment, and passes through the first transmissive layer 101. An LED is a robust, convenient and cost-effective source of broad band light. The incident light (rays 230) is partially absorbed/scattered by the liquid dispersion 14, and what remains of this incident light 230 is diffusely reflected from the surface 102a. The light diffusely reflected off this surface 102a (rays 232), travels outwards towards the photodetector 220, and is also partially absorbed/scattered by the liquid dispersion 14. Ignoring the path in and back through the light-transmissive layer 101 because it has a negligible effect on the light passing through it, the optical path length of this arrangement, therefore, is approximately twice the fluid gap 106. The photodetector 220 measures the reflected light received from the solid, diffuse background surface 102a. The optical characteristics of this diffuse surface do not change. The fraction of light transmitted through the liquid dispersion, however, and reaching the photodetector 220 (as rays 234) can change during material processing. In the case of graphene production, the absorption of the liquid dispersion 14 increases as 2D material 18,20 is exfoliated from a graphite precursor 10. The diffuse reflectance spectroscopy device 200, therefore, indirectly senses changes in the optical characteristics of the liquid dispersion 14 by measuring the reflected light from a diffuse background surface 102a. This provides a real-time, non-invasive measure of the concentration of 2D material 18,20 produced in the exfoliation process.

Figure 1:
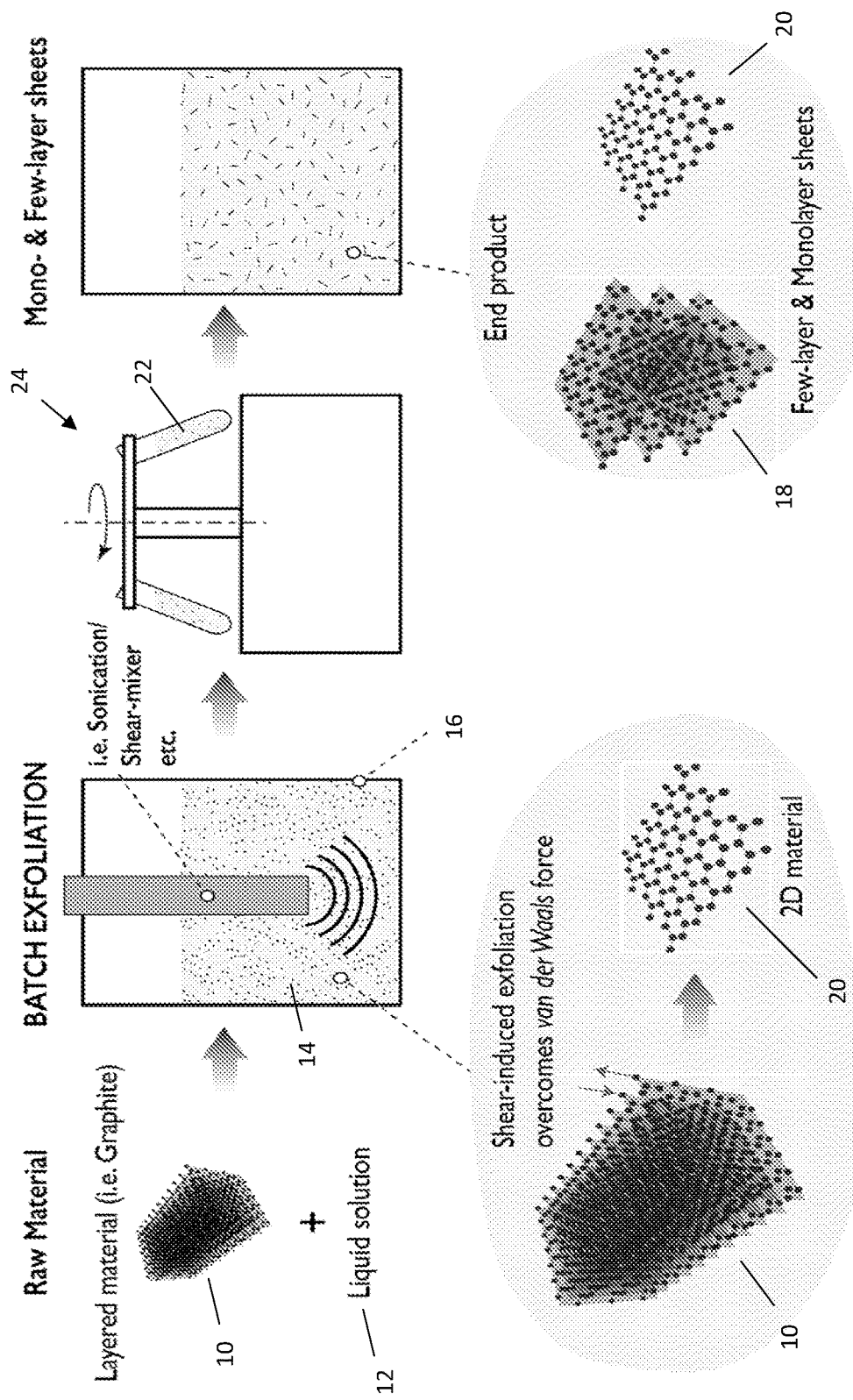
FIG. 1 is a schematic outline of a known batch exfoliation process and associated ex situ testing via manual sampling and centrifugation.

This indirect method of testing the concentration of material produced was tested by performing a controlled experiment in the apparatus 100 of FIG. 1 using a graphene-NMP dispersion with an initial concentration $C_G$ of approximately 0.075 mg/mL. The rotor 109 was operated at 750 rpm, resulting in a moving diffuse background 102a and moving liquid dispersion 14. At 30 minute intervals, 100 mL of NMP was added to the reservoir of the system, reducing the concentration of graphene. The reflectance was measured at 680 nm. This wavelength was selected because it is a suitable wavelength for determining the concentration of graphene in solution independent of the associated layer number, thus providing a simple reliable indication of the average concentration of graphene in the liquid dispersion. This is also apparent in the extinction spectrum shown in FIG. 7 and as discussed below. The reflectance signal of the photodetector 220 has been replotted on FIG. 5 to represent solution concentration, using Kubelka-Munk theory, as described in G. Kortum. "Reflectance Spectroscopy: Principles, Methods, Applications". Springer-Verlag New York (1969). $C_G \sim (1-R^2)/2R$, where R is reflectance (a.u.). A comparison between the known input concentration and the measured response from the in situ device 200, is thus presented in FIG. 5. The results confirm the invention is a valid method for measuring graphene concentration changes in solution.

The skilled person would appreciate that the invention has wider applicability than just to liquid exfoliation of 2D nanomaterials and production using apparatus akin to the apparatus 100 disclosed above. For example, the invention could be applied to the monitoring of the concentration of material produced by any chemical process in which the material is produced in a liquid dispersion, such as sensing formulations, drug discovery, and pharmaceutical production.

Moreover, it will be appreciated that any or all of the diffusely reflective surface, the light-transmissive layer and the liquid dispersion in the fluid gap may be either moving or static, in any combination. For example, the apparatus 100 as illustrated in FIGS. 2 and 3 has one moving diffuse boundary formed by the rotor 102 and associated diffusely reflective surface 102a, a moving liquid dispersion 14, and a static transmissive boundary formed by the outer casing 101—i.e. an M-M-S configuration from the inside outwards. It is, however, equally possible to apply the technique to any moving/static arrangement, i.e. M-M-M, S-M-S, etc., which opens up a range of application possibilities in terms of monitoring processes continuously, or studying processes affected by fluid transport phenomena/shear.

Thus, at a high level, the apparatus 100 may simply comprise first and second opposed layers that are separated by a fluid gap filled with a liquid dispersion containing a precursor of the material under production in a suitable carrier or solvent, where the first layer 101 is light-transmissive and the second layer 102 has a diffusely reflective surface 102a facing the first layer, in combination with a reflectance spectroscopy device 200 positioned on the opposite side of the light-transmissive layer 101 to the diffusely reflective surface 102a.

Figure 5:
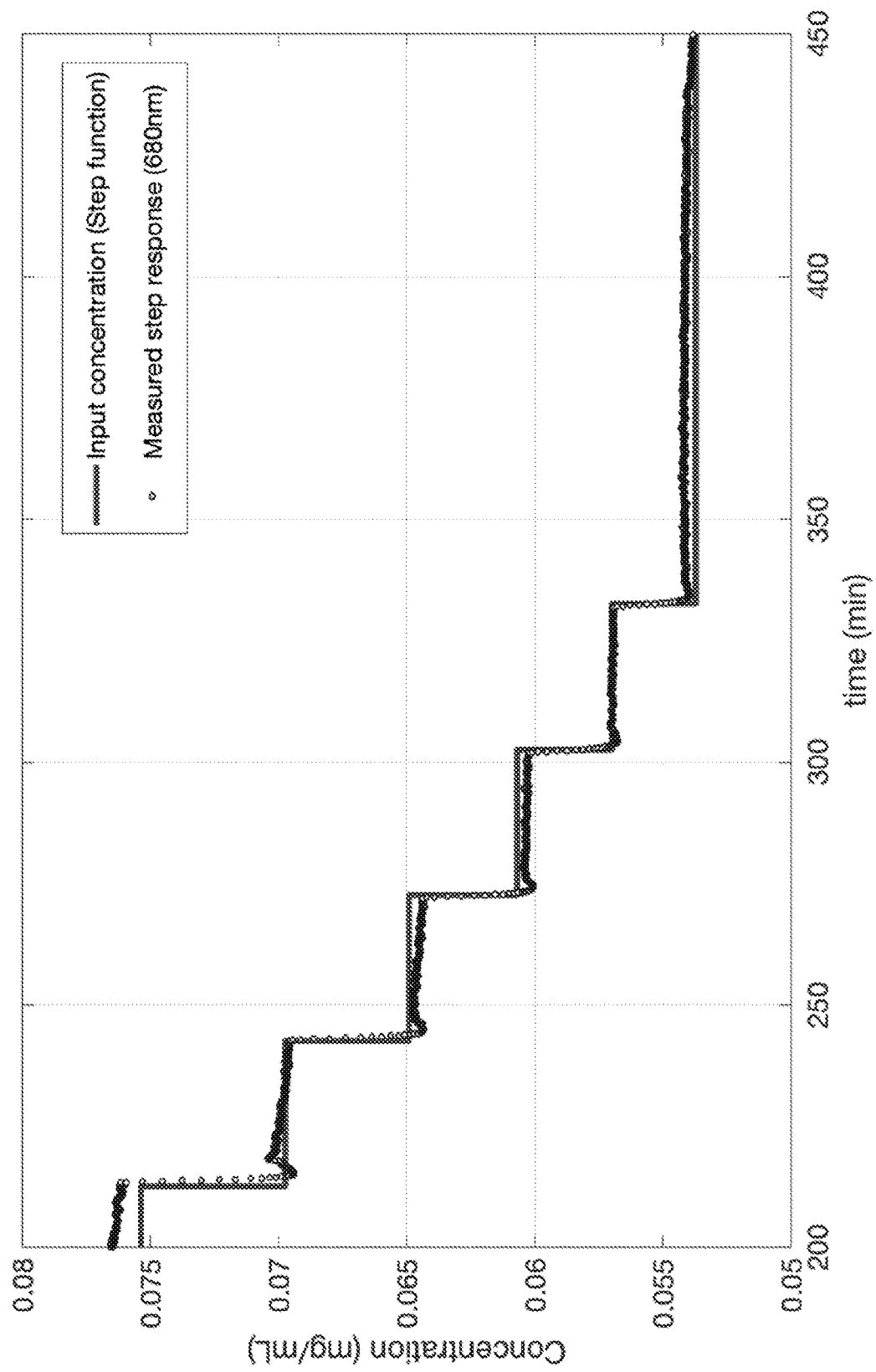
FIG. 5 is a graph showing a measured response of the invention to controlled step changes in concentration over time.
Figure 6:
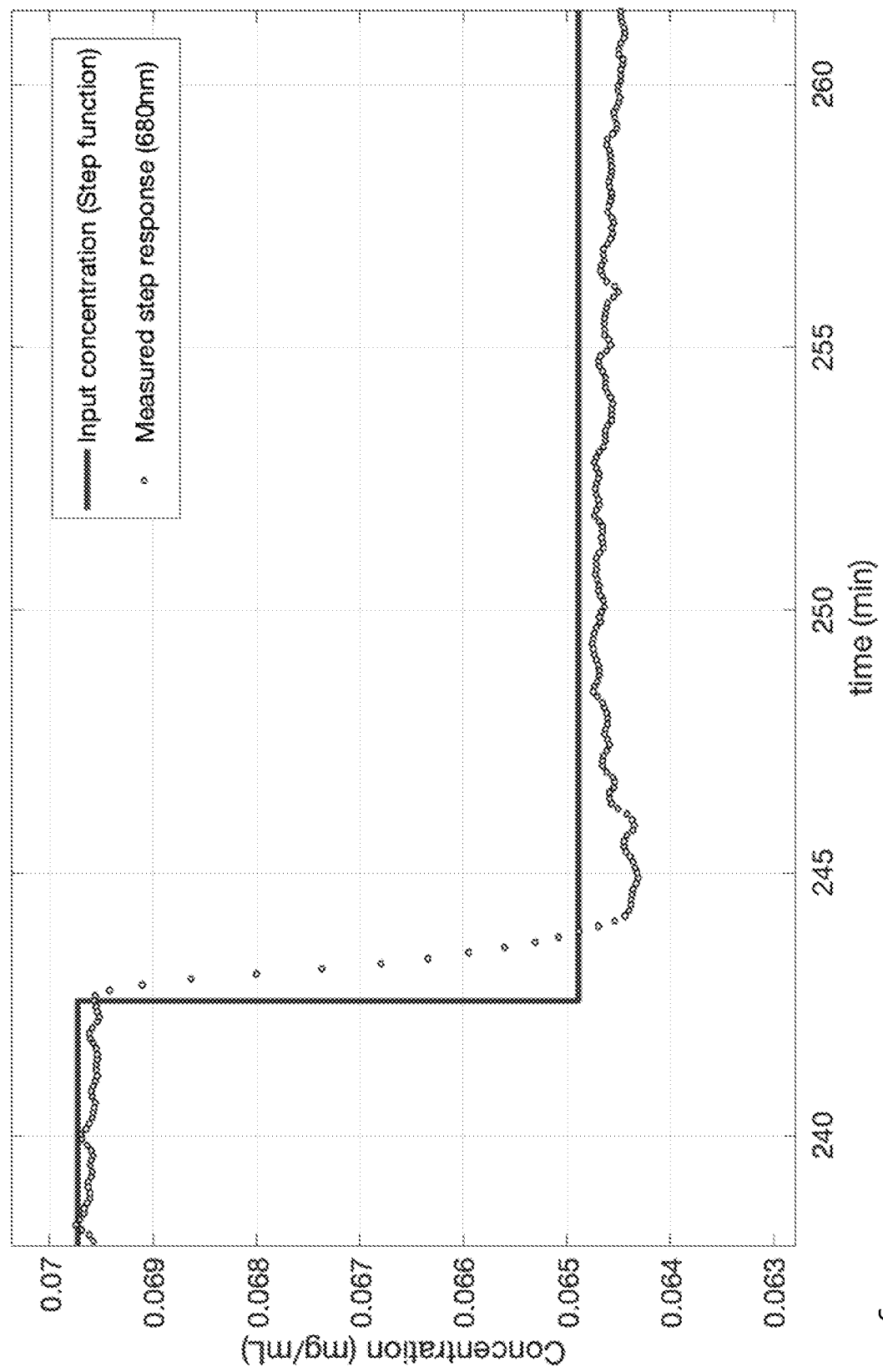
FIG. 6 is a closer view of the graph of FIG. 5, showing one step change in concentration in greater detail.

FIG. 6 is a closer view of one step change in concentration from FIG. 5 and illustrates that the measured response does not exactly follow the input. This is a physical characteristic of the flowing system. This effect occurs as it takes time to mix the pure NMP, introduced into the reservoir, throughout the entire fluid loop. This in situ approach can therefore provide a useful insight on the time constants of chemical processing systems. The data plotted on FIGS. 5 and 6 was obtained at a moderate 3 s interval, as the time constant is of order minutes for the exemplary system producing graphene. This measurement interval can be adjusted, without difficulty, to millisecond intervals for monitoring faster formulation processes.

As described above, by detecting light 234 reaching the photodetector 220 at a single appropriate wavelength, it is possible to reliably determined the average concentration of the material produced in the liquid dispersion. For 2D materials produced by a liquid exfoliation process, however, it is further possible to determine the average number of layers in the 2D material produced in the liquid dispersion by taking a multispectral approach. This multispectral process will be explained by reference to FIGS. 7 to 9 in particular, in the context of graphene production. It will be understood that the principles may be applied more broadly to the liquid exfoliation of any 2D material.

Figure 7:
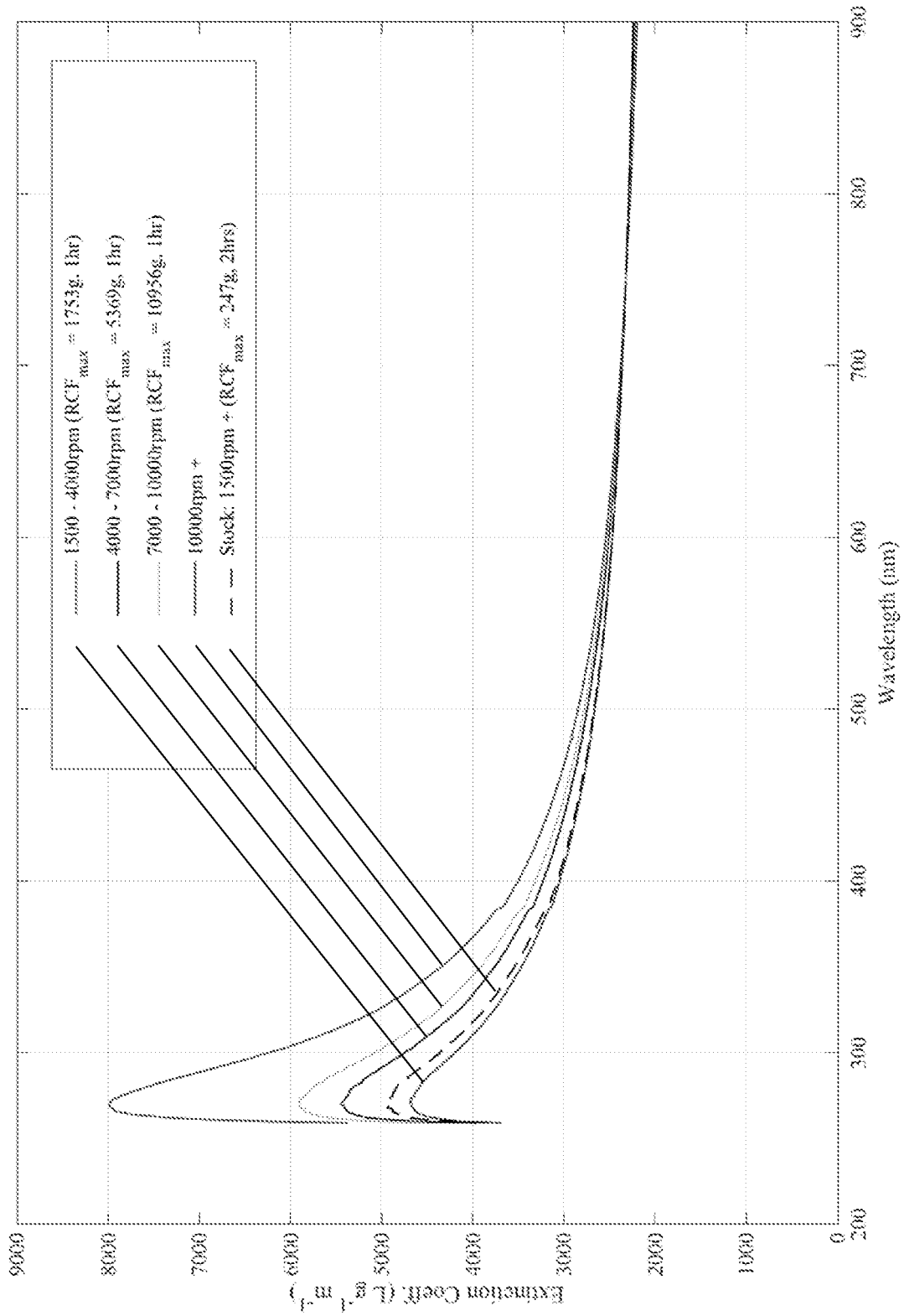
FIG. 7 is a graph showing extinction coefficient spectra of few-layer graphene from transmission ex situ uv-vis-nIR spectroscopy.

FIG. 7 is a plot of extinction spectra for graphene samples prepared using different relative centrifugation forces (RCF) and analysed using traditional ex situ uv-vis-nIR spectroscopy. One such UV-Vis-nIR measurement and the spectroscopic method is described by Backes et al., Nanoscale, 8 (2016), 4311-4323, the contents of which are herein incorporated by reference in their entirety. As the centrifugation speed/RCF was increased, thicker nanosheets sediment, leaving a supernatant with a lower average layer number. For example, centrifugation at >10000 rpm produces samples containing graphene having the lowest number of atomic layers, such as monolayer sheets, whereas centrifugation at just 1500-4000 rpm will produce samples containing graphene having the greatest number of layers, on average. This shows that the number of layers in graphene dispersions correlates with a change in the associated spectral shape.

In the case of graphene, absorption dominates the extinction spectra and scattering is much less prevalent. One way to capture this change in spectral shape with layer number is to consider the ratio of the maximum absorption—i.e. the absorption at approximately 280 nm in the case of graphene—with the absorption at a wavelength that is only affected by solution concentration—i.e. the average concentration of graphene in all forms in the liquid dispersion (which is therefore independent of layer number). From the data for graphene shown in FIG. 7, this wavelength that is independent of layer number is from approximately 550 nm and higher, where the spectra all substantially overlap.

Figure 8:
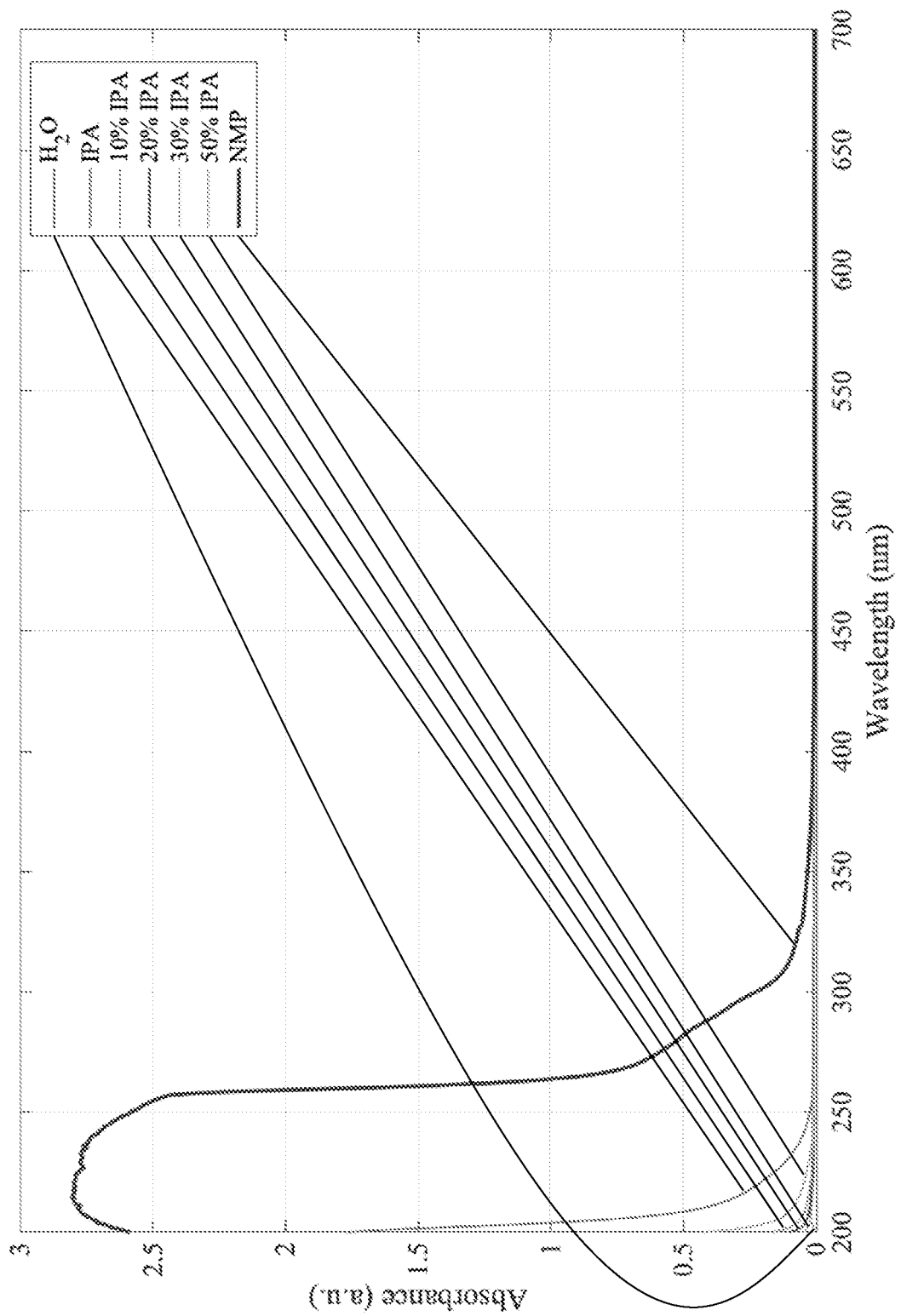
FIG. 8 is a graph showing absorption spectra for various solvents and co-solvents used in the production of 2D materials.

A limitation, however, of using the maximum absorption is that the wavelength can coincide with high absorption regions for the associated solvent. This is shown in FIG. 8, notably showing NMP as having relatively high absorbance in the range 200 nm-300 nm or so. Thus, for graphene in an NMP solvent, it would be difficult to accurately measure the peak absorption at say 280 nm. Another practical limitation is the transmissivity of the transmissive layer 101, which would have to transmit UV wavelengths as low as about 260 nm in order to reliably measure the peak absorption. As noted above, the exemplary borosilicate layer 101 of the apparatus 100 has a flat transmissivity profile of approximately 90% from 400 nm-1000 nm, but towards the UV wavelengths, below 400 nm, it begins to drop off considerably. Whereas that limitation could, however, be addressed through selection of a window which is transmissive in the UV range, that might preclude the use of preferred materials such as borosilicate glass.

Considering both constraints, for graphene in NMP, an absorbance ratio 550 nm/450 nm (equivalent to a reflectance ratio 450 nm/550 nm) was chosen to examine if a multispectral indirect diffuse spectroscopy approach could detect changes to graphene layer number in situ. A graphene-NMP dispersion, with an average layer number of ~9, was introduced into the liquid exfoliation apparatus 100 of FIGS. 2 and 3. The apparatus was operated at 300 rpm for the first 50 minutes. This speed was selected as it does not produce sufficient shear stress to exfoliate graphene so the absorption spectra should also be unaffected. At 50 mins, the speed was increased to 1250 rpm, which resulted in graphene exfoliation. As observed in FIG. 9, which compares the results obtained from the multispectral indirect diffuse spectroscopy in situ approach to ex situ measurements that were also taken in parallel, the absorption ratio decreases in a similar manner for both techniques until the end of the test, where the average layer number is ~7. This confirms that the indirect diffuse spectroscopy approach can also be used to measure the average number of layers in a 2D material dispersion if the photodetector 220 is configured to detect light at at least two different frequencies (or frequency bands centred on those frequencies) within at least two distinct frequency ranges. Which different frequencies (or frequency bands) are to be used will depend on the characteristic extinction coefficient spectra for the particular 2D material being produced, the absorption spectrum of the associated solvent and the transmissivity properties of the transmissive layer 101.

Traditional uv-vis-nIR spectroscopy approaches can resolve the absorbance spectra of liquid dispersions to 1 nm or less. This resolution is beneficial for detailed scientific measurements of complex spectra. However, as shown in FIG. 7, graphene has a particularly straightforward spectra with a single pi-pi* peak in absorbance and a long wavelength plateau. There is therefore some flexibility in the wavelengths that can be used for the measurement of average concentration, independent of layer number, (i.e. anywhere in the range of about 550 nm-900 nm) and for the measurement of layer number using multispectral sampling (i.e. anywhere in the range of about 260 nm-450 nm). To reiterate, in the 550 nm-900 nm range, changes in concentration produces a set of self-similar curves, regardless of the size/layer number (see FIG. 7: When the spectra is normalised to the concentration, the curves collapse on top of one another). In the 260 nm-450 nm range, the curves also have the same characteristic as one another, but here with the peak absorbance changing linearly with layer number.

In traditional uv-vis-nIR spectroscopy, absorbance at a single wavelength is selected (i.e. 750 nm) to calculate changes in concentration. The self-similar characteristic of the graphene spectra, however, makes it possible to measure these concentration changes across a range of wavelengths. The spectrum can therefore be discretised into larger bandwidths (e.g. 40 nm), and whereas this reduces the wavelength resolution, it also removes the need for complex, expensive and large optical setups (such as gratings, slits, lenses, etc.). Instead, the photodetector 220 can comprise a standard CMOS silicon photodiode array with Gaussian filters to detect a fixed bandwidth centred on a chosen wavelength (e.g. 450 nm, 550 nm, etc.). All of the in situ measurements presented here (in FIGS. 5, 6, 9, 11, 12 and 13) were acquired using this approach.

In certain embodiments, the flow of the liquid dispersion 14 through the apparatus 100 can be controlled so as to generate a concentration gradient across the fluid gap 106. A concentration gradient comprises the partial separation of large precursor material particles 10 (e.g. graphite) from smaller exfoliated mono- or few-layer nanosheets 18,20 (e.g. graphene) during the exfoliation process. This is shown in FIGS. 10A and 10B, which depict a liquid dispersion of graphite in NMP that has been processing for a time of less than 10 minutes. The rotation of the inner cylinder 101 creates vortices (schematic of FIG. 2) in the fluid gap 106. Introducing an axial flow through this gap 106 moves graphite particles 10 towards the top of the device (upper zone), and results in a gradient in the graphite concentration. By producing a dispersion gradient, in which one zone has a higher concentration of material in suspension in the liquid than another zone, the light path from the light source 210 to the associated photodetector 220 can be located in an optimal location for best detecting the changes in concentration of the material in the liquid dispersion, for example where there is less raw precursor material (e.g. graphite 10) to interfere with the indirect diffuse reflectance spectroscopy approach. The skilled person would understand that there are a number of alternative ways of inducing a dispersion gradient and that this will depend on the apparatus being used. By way of example, a tapering channel might be employed to induce a change in flow rate, thereby inducing a dispersion gradient. It will further be understood that the dispersion gradient can be used to monitor other process parameters; for example one alternate use could be particle size selection. If the aim of the process was to separate large particles from small particles, this sensing approach could be used to measure how efficiently it can be achieved.

Figure 11:
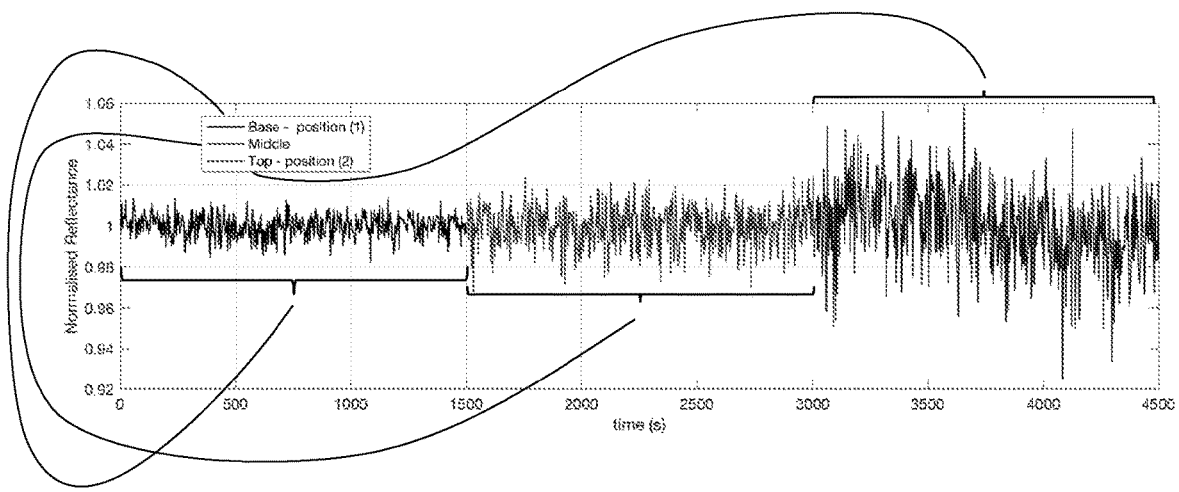
FIG. 11 is a graph illustrating the effect of graphite concentration gradient on the measured response.

FIG. 11 demonstrates the effect of the graphite interference. Locating the diffuse reflectance spectroscopy device 200 at the base of the apparatus 100 (Position (1) on FIG. 2—where the graphite concentration is lowest) produces the lowest reflectance signal noise (~1%). If the device 200 is located towards the top (Position (2) of FIG. 2, with the highest graphite concentration), the reflectance signal noise is >5%. Thus, by controlling the flow of the liquid dispersion to produce a concentration gradient across the fluid gap and by positioning the diffuse reflectance spectroscopy device 200 so that the light path from the light source 210 to the photodetector 220 is directed through a zone of least concentration, this has been shown to provide the best signal to noise ratio for the photodetector, accordingly leading to more accurate detection.

Figure 12:
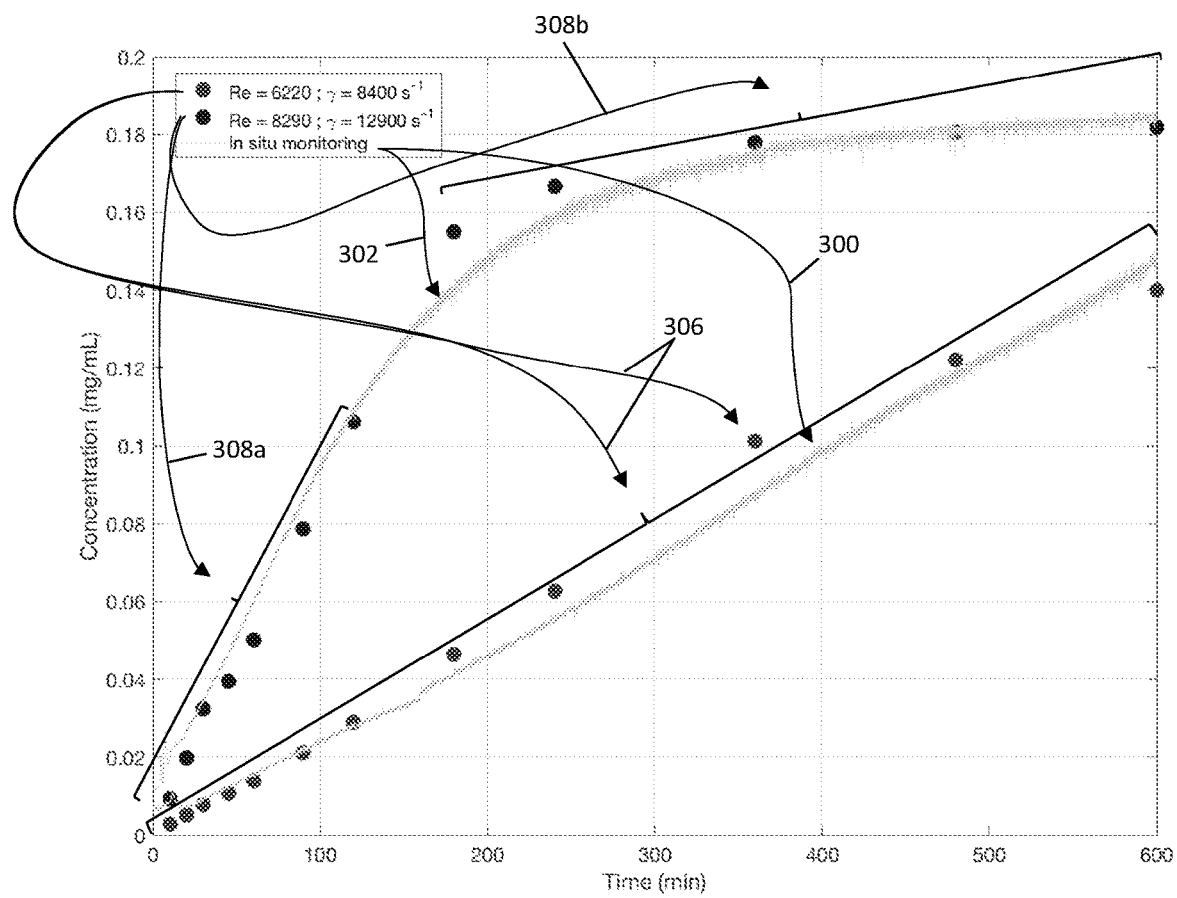
FIG. 12 is a graph illustrating monitoring the production of graphene during liquid phase exfoliation, comparing methods according to embodiments of the invention against known ex situ methods.

The apparatus 100 was used to measure the production of graphene from graphite in NMP (with an initial concentration of 10 g/L). The results for two device speeds, corresponding to different exfoliation performances, are shown in FIG. 12. The in situ approach using the diffuse reflectance spectroscopy device 200 as shown by the solid line plots 300;302 captures the associated two different trends in graphene production, and closely tracks the measurements made using the traditional ex situ method, which are shown by the discrete data points 306;308a,308b (the plot 300 and the data points 306 corresponding to the production at a rotational Reynolds number of 6220 and a shear rate of 8400 s$^{-1}$; and the plot 302 and the data points 308a,308b corresponding to the production at a rotational Reynolds number of 8290 and a shear rate of 12900 s$^{-1}$). Accordingly, the diffuse reflectance spectroscopy approach is proven to provide reliable monitoring of the production of graphene during liquid phase exfoliation, in real-time and non-invasively.

It will be seen that the plot 300 and the data points 306 corresponding to the production at the lower speed show a linear relationship between concentration against processing time. However, the production at the higher speed shows a non-linear relationship: with an initial linear phase shown by the data points 308a, in which the concentration increases more rapidly than for production at the lower speed; followed by a transition to a second phase depicted by the data points 308b, which shows a flattening-off of the response, where the concentration only increases very marginally in comparison to the initial phase (and as compared against the lower speed production also). This shows that for the higher speed production there is a diminishing return after approximately 200 min for this particular example. Thus, production can be stopped or altered once it is known from the real-time in situ measurements that the concentration is no longer increasing sufficiently.

Figure 13:
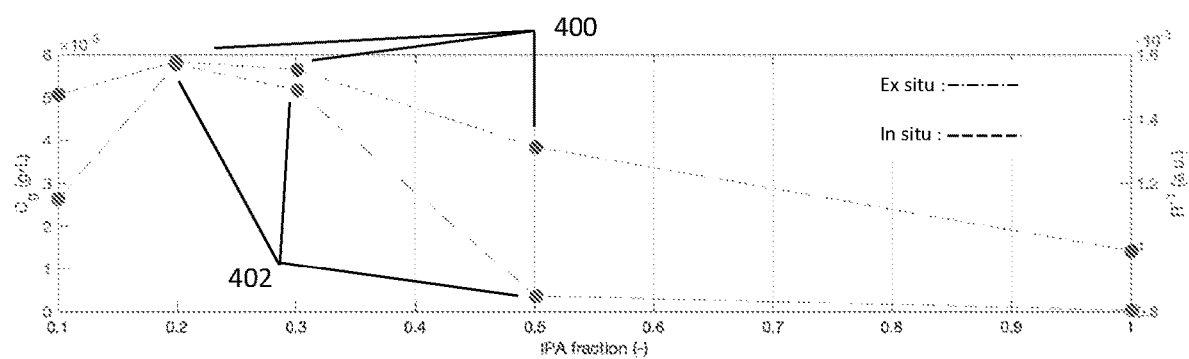
FIG. 13 is a graph illustrating measurement of graphene production with $H_2O$/IPA co-solvents in different fractions; methods according to embodiments of the invention using inverse reflectance, and known ex situ methods using concentration.

Whereas the exemplary tests discussed above to demonstrate the effectiveness of the diffuse reflectance spectroscopy approach of the invention have been carried out to measure the production of graphene from graphite in NMP, a similar set of exfoliation tests were carried out to measure the production of graphene from graphite using different co-solvents of $H_2O$/IPA. The results, presented in FIG. 13, illustrate that the invention is also capable of detecting the optimal co-solvent to maximize production performance. It can be seen that the results from the in situ diffuse reflectance spectroscopy approach closely mirror those of the parallel ex situ testing carried out using traditional uv-vis-nIR spectroscopy. The data points 400 of the ex situ testing for this particular example show that the maximum concentrations are achieved when using an IPA fraction of about 0.2 to 0.3, which corresponds to the maximum absorption (inverse reflectance) for the each of the corresponding data points 402 from the in situ testing. Thus, the highest inverse reflectance readings from the in situ testing mirror the best concentration production. By running the experiments only altering the solvent or the co-solvent ratios, in situ diffuse reflectance spectroscopy according to the invention can therefore determine the optimal solvent or co-solvent ratio to maximize production performance.

In summary, the diffuse reflectance spectroscopy method of the invention has a number of advantages:

Information about the process performance is acquired in real-time, in comparison to the existing ex situ approaches which typically take days. This allows for immediate action if there is a problem with the process, on-the-fly optimisation of production, and batch-to-batch comparisons.

Measurements are performed non-invasively. Traditional measurements methods may require, in some instances, the process to be stopped to perform sampling. Also, the act of physically sampling a point location in the process can introduce systematic error and uncertainty in the measured quantity, such as concentration.

High temporal resolution. The temporal resolution is seconds, whereas existing sampling methods are usually only feasible in 10 minute-1 hour intervals. It should be noted that millisecond resolution or lower is possible, limited only by the electronics and the application requirements. For the current work on graphene exfoliation, the inventors have determined that 3 second sampling intervals is adequate.

Mixing/residence time characterisation. The response to changes in the system can be measured in high resolution, as noted above. This makes it possible to measure the mixing time and/or residence time of processes.

Exfoliation detection. Through the multispectral approach, it is possible to measure the process parameters where exfoliation occurs, in real-time.

Easy implementation in real systems. The invention is much easier to implement, compared to traditional uv-vis-nIR spectroscopy of liquids, as the source and the photodetector are on the same plane. This makes it possible to position the monitoring system on the exterior of the apparatus (as shown in the exemplary apparatus of FIGS. 2 and 4), without needing a major re-design to accommodate. Traditional uv-vis-nIR spectroscopy of liquid samples implements a transmission approach, where the light source is aligned opposite to the photodetector (with the sample placed in-between). The traditional approach, therefore, is restricted to: a re-design of the apparatus and associated process (to allow placement of either the photodetector or the source inside the apparatus); or performing the measurements ex situ, taking continuous samples from the process that would then pass through a flow cell.

Broad range of flow conditions. The invention works for static and dynamic configurations. This includes moving liquid samples, and moving boundaries/surfaces. This provides for many applications that require analysis of samples under the influence of hydrodynamic stresses/shear (i.e. biology).

Low cost implementation. The exemplary apparatus 100 uses an LED 210 and photodiode array 220, with Gaussian filters to discretize the spectrum into narrow bands. The stainless steel reflectance surface, used in the proposed indirect reflectance method, is as-machined (i.e. without specialised surface finishing). All of this avoids the need for expensive optical components to resolve the material's spectrum to nm resolution. The result is a device which costs in the order of $20 compared to laboratory uv-vis-nIR spectrophotometers which are in the order of $30,000 or more. This is advantageous as it can be scaled-out to sense multiple locations, or monitor multiple production devices which are run in parallel in an industrial environment. Alternatively, if high accuracy/resolution is preferred over cost, the invention can instead be implemented using more specialised light source and detection components as in high-end spectrophotometers.

Compatible with Industrial Internet of Things (IoT/IIoT/Industry 4.0). Associatedly, the low capital cost allows for thousands of sensing devices to be connected into a much larger production/manufacturing network (either in a single facility, or even across multiple global facilities operating in tandem/in parallel).

Broad application. The primary focus of this invention is real-time monitoring in liquid phase exfoliation of graphene. However, the skilled person would readily appreciate that the diffuse reflectance optical method has applicability across a wide variety of chemical processing industries such as in sensing formulations, drug discovery, and pharmaceutical production.

It will be appreciated that many of the features described above, particularly of the preferred embodiments, are inventive in their own right and not just as part of an embodiment of the present invention. Independent protection may be sought for these features in addition to or alternative to any invention presently claimed.

In summary, a method for monitoring the production of a material such as graphene in a liquid dispersion in real time, comprises supplying the liquid dispersion to a fluid gap defined between a first layer and an opposed second layer, wherein the first layer is light-transmissive and wherein the second layer has a diffusely reflective surface facing the first layer. The diffusely reflective surface is illuminated with light from a light source and light reflected from the diffusely reflective surface is detected at an associated photodetector. A light path from the light source to the photodetector comprises the light passing through the transmissive layer towards the diffusely reflective surface through the fluid gap, reflecting off the diffusely reflective surface and passing back through the fluid gap towards and onwards through the transmissive layer. The concentration of the material in the liquid dispersion can be determined from the detected reflected light. The fluid gap is typically an integral part of apparatus for producing the material, such as being formed between an inner rotor and an outer casing wall of a liquid exfoliation apparatus.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of monitoring production of a material in a liquid dispersion in real time, the method comprising:
   supplying the liquid dispersion to a fluid gap defined between opposing first and second layers, wherein the first layer is light-transmissive and the second layer has a diffusely reflective surface facing the first layer;
   moving at least one of the first and second layers;
   illuminating the diffusely reflective surface with light from a light source and detecting light reflected from the diffusely reflective surface with a photodetector, wherein a light path from the light source to the photodetector includes the light passing through the transmissive layer towards the diffusely reflective surface through the fluid gap, reflecting off the diffusely reflective surface and passing back through the fluid gap and through the transmissive layer; and
   determining, from the detected reflected light, a concentration of the material in the liquid dispersion.

2. The method of claim 1, wherein the supplying of the liquid dispersion to the fluid gap is continuous.

3. The method of claim 1, wherein the concentration of the material in the liquid dispersion is determined by detecting a fraction of light that arrives at the photodetector from the light source.

4. The method of claim 1, further comprising inducing flow in the liquid dispersion within the fluid gap.

5. The method of claim 1, further comprising inducing a dispersion gradient in the liquid dispersion within the fluid gap.

6. The method of claim 5, wherein the light path from the light source to the photodetector is directed through a zone of least concentration.

7. The method of claim 1, wherein the material includes a 2D nanomaterial and the method of production further comprises fluidic exfoliation.

8. The method of claim 7, wherein the 2D nanomaterial includes material exfoliated from graphite, BN, GaTe, $Bi_2Se_3$, $Bi_2Te_3$, $Sb_2Te_3$, TiNCl, black phosphorus, layered silicate, layered double hydroxide (such as $Mg_6Al_2(OH)_{16}$) or a transition metal chalcogenide having the formula $MX_n$, and wherein M is a transition metal, X is a chalcogen and n is 1 to 3, or a combination thereof.

9. The method of claim 8, wherein M is selected from the group consisting essentially of Ti, Zr, Hf, V, Nb, Ta, Cr, Mn, Mo, W, Tc, Re, Ni, Pd, Pt, Fe and Ru; and X is selected from the group consisting of O, S, Se, and Te.

10. The method of claim 7, wherein illuminating and detecting the light includes a multispectral analysis, the method further comprising determining an average number of layers of the nanomaterial in the liquid dispersion by determining a ratio of light detected in a first frequency band to light detected in a second frequency band.

11. The method of claim 10, wherein the material includes graphene exfoliated from graphite, and wherein the first frequency band is about 260 nm-450 nm and the second frequency band is about 550 nm-900 nm.

12. The method of claim 1, wherein the liquid dispersion includes an organic solvent, for example N-methyl pyrrolidone (NMP), cyclohexylpyrrolidone, di-methyl formamide, cyclopentanone (CPO), cyclohexanone, N-formyl piperidine (NFP), vinyl pyrrolidone (NVP), 1,3-dimethyl-2-imidazolidinone (DMEU), bromobenzene, benzonitrile, N-methyl-pyrrolidone (NMP), benzyl benzoate, N,N'-dimethylpropylene urea, (DMPU), gamma-butrylactone (GBL), Dimethylformamide (DMF), N-ethyl-pyrrolidone (NEP), dimethylacetamide (DMA), cyclohexylpyrrolidone (CHP), dimethyl sulfoxide (DMSO), dibenzyl ether, chloroform, isopropylalcohol (IPA), cholobenzene, I-octyl-2-pyrrolidone (N8P), 1-3 dioxolane, ethyl acetate, quinoline, benzaldehyde, ethanolamine, diethyl phthalate, N-dodecyl-2-pyrrolidone (N12P), pyridine, dimethyl phthalate, formamide, vinyl acetate or acetone or a combination thereof.

13. The method of claim 1, wherein the liquid dispersion includes:
   a polymer selected from the group consisting essentially of polyvinyl alcohol (PVA), polybutadiene (PBD), poly (styrene-co-butadiene) (PBS), polystyrene (PS), polyvinylchloride (PVC), polyvinylacetate (PVAc), polycarbonate (PC), polymethylmethacrylate (PMMA), polyvinylidene chloride (PVDC) and cellulose acetate (CA); and/or
   a surfactant selected from the group consisting essentially of sodium cholate (NaC), sodium dodecylsulphate (SDS), sodium dodecylbenzenesulphonate (SDBS), lithium dodecyl sulphate (LDS), sodium cholate (SC), sodium deoxycholate (DOC), sodium taurodeoxycholate (TDOC), polyoxyethylene (40) nonylphenyl ether, branched (IGEPAL CO-890® (IGP)), polyethylene glycol p-(1,1,3,3-tetramethylbutyl)-phenyl ether (Triton-X 100® (TX-100)), cetyltrimethyl ammoniumbromide (CTAB), tetradecyltrimethylammonium bromide (TTAB), Tween™ 20 and Tween™ 80.

14. An apparatus for monitoring production of a material in a liquid dispersion in real time, the apparatus comprising:
   a fluid gap defined between opposing first and second layers, wherein the first layer is light-transmissive and the second layer has a diffusely reflective surface facing the first layer, and wherein at least one of the first and second layers are adapted to move;
   a light source; and
   a photodetector;
   wherein the fluid gap is in fluid communication with the liquid dispersion;
   wherein a light path from the light source to the photodetector includes the light passing through the transmissive layer towards the diffusely reflective surface through the fluid gap, reflecting off the diffusely reflective surface and passing back through the fluid gap and through the transmissive layer; and
   wherein the photodetector is adapted to determine, from the light reflected off the diffusely reflective surface, a concentration of the material in the liquid dispersion.

15. The apparatus of claim 14, wherein the fluid gap is an integral part of a vessel for producing the material.

16. The apparatus of claim 15, wherein the vessel for producing the material is adapted for fluidic exfoliation of a layered material and the vessel includes:
   a housing of circular cross-section defined by a housing wall;

a hollow rotor of circular cross-section having a first end and a second end and a wall positioned therebetween arranged concentrically within the housing, wherein the wall of the hollow rotor defines an inner chamber and a space between the wall of the hollow rotor and the housing wall defines an outer chamber, and wherein a fluid flow path is provided between the inner chamber and the outer chamber;

a fluid inlet in fluid communication with one of the inner and outer chambers; and a fluid outlet in fluid communication with the other of the inner and outer chambers;

wherein the outer chamber has a width such that on passage of a fluid including the layered material from the inlet to the outlet through the outer chamber, a shear rate sufficient to exfoliate the layered material may be applied to the fluid including the layered material in the outer chamber by rotation of the hollow rotor;

wherein the fluid including the layered material is the liquid dispersion and the material produced by the fluidic exfoliation includes a 2D nanomaterial; and wherein the fluid gap includes at least a portion of the outer chamber.

17. The apparatus of claim 16, wherein the first layer includes at least a portion of the housing wall and the second layer includes at least a portion of the hollow rotor wall.

18. The apparatus of claim 14, wherein the first layer includes borosilicate glass.

19. The apparatus of claim 14, wherein the second layer includes stainless steel.

20. The apparatus of claim 14, wherein the light source includes a broad spectrum LED.

21. The apparatus of claim 14, wherein the photodetector includes a CMOS silicon photodiode array.

22. The apparatus of claim 14, wherein the photodetector further includes at least one Gaussian filter for detecting light in at least one frequency band.

23. The apparatus of claim 22, wherein the frequency band includes 40 nm band.

24. The apparatus of claim 14, wherein the photodetector is adapted to detect in at least first and second frequency ranges and determine a ratio of light detected in those first and second frequency ranges.

25. The apparatus of claim 24, wherein the first frequency is about 260 nm-450 nm and the second frequency is about 550 nm-900 nm.

26. A method, comprising:
using the apparatus of claim 14 to illuminate a diffusely reflective surface and detect light reflected from the diffusely reflective surface with a photodetector in determining the concentration of a material in a liquid dispersion in real time during production thereof.

27. A method, comprising:
using the apparatus of claim 24 to illuminate a diffusely reflective surface and detect light reflected from the diffusely reflective surface with a photodetector to determine an average number of layers of a 2D nanomaterial in a liquid dispersion in real time during liquid exfoliation thereof.

\* \* \* \* \*